(12) United States Patent
Amancherla et al.

(10) Patent No.: US 10,348,415 B2
(45) Date of Patent: Jul. 9, 2019

(54) OPTICAL WIRELESS COMMUNICATIONS FOR VEHICLE OPERATOR PERSONAL COMPUTING DEVICES

(71) Applicant: Honeywell International Inc., Morris Plains, NJ (US)

(72) Inventors: Pavan Kumar Amancherla, Telangana (IN); Srinivasa Rao Madishetti, Telangana (IN); Shubham Agarwal, Jaipur (IN); Anil Kumar Vanarasi, AyodhyaNagar (IN)

(73) Assignee: Honeywell International Inc., Morris Plains, NJ (US)

( * ) Notice: Subject to any disclaimer, the term of this patent is extended or adjusted under 35 U.S.C. 154(b) by 0 days.

(21) Appl. No.: 15/608,424

(22) Filed: May 30, 2017

(65) Prior Publication Data

US 2018/0351654 A1 Dec. 6, 2018

(51) Int. Cl.
*H04B 10/114* (2013.01)
*H04B 10/80* (2013.01)
(Continued)

(52) U.S. Cl.
CPC ....... *H04B 10/801* (2013.01); *G06F 11/3013* (2013.01); *H04B 10/116* (2013.01);
(Continued)

(58) Field of Classification Search
CPC ............................................ H04B 10/11–118
(Continued)

(56) References Cited

U.S. PATENT DOCUMENTS 5,519,527 A * 5/1996 Panton ................ G06F 13/4063
398/117
5,877,882 A * 3/1999 Green ................ H04B 10/1143
398/107
(Continued)

FOREIGN PATENT DOCUMENTS

WO 2009132877 11/2009

OTHER PUBLICATIONS

Hsu, "FAA: Airlines Must Replace Boeing Cockpit Screens to Avoid Wi-Fi Interference", "retrived on May 3, 2017 from http://spectrum.ieee.org/tech-talk/aerospace/aviation/faa-airlines-must-replace-boeing-cockpit-screens-to-avoid-wifi-interference", Oct. 3, 2014, pp. 12, Publisher: IEEE Spectrum.
(Continued)

*Primary Examiner* — Li Liu
(74) *Attorney, Agent, or Firm* — Bookoff McAndrews, PLLC (57) ABSTRACT

Optical wireless communications for vehicle operator personal computing devices is provided. In one embodiment, a system comprises: a bus I/O processor coupled to a vehicle data bus, the I/O processor executing a protocol converter; an optical communication transceiver coupled to the I/O processor, the transceiver in communication with an optical unit comprising an optical emitter and sensor, the optical unit within a control compartment of the vehicle; the bus I/O processor exchanges vehicle operational data with on-board data processing devices over the vehicle data bus using a vehicle data bus protocol; the transceiver controls the optical unit to establish a bidirectional optical wireless communications (OWC) link with a personal computing device in the control compartment using an OWC protocol; the I/O processor communicates information relevant to the operation of the vehicle between an on-board data processing device
(Continued)

and an application executing on the personal computing device over the OWC link.

20 Claims, 3 Drawing Sheets

(51) Int. Cl.
*G06F 11/30* (2006.01)
*H04B 10/116* (2013.01)
*H04L 29/08* (2006.01)

(52) U.S. Cl.
CPC ..... *H04B 10/1143* (2013.01); *H04B 10/1149* (2013.01); *H04L 67/12* (2013.01)

(58) Field of Classification Search
USPC .................................. 398/103, 118–131, 172
See application file for complete search history.

(56) References Cited

U.S. PATENT DOCUMENTS

| | | | | |
|---|---|---|---|---|
| 6,064,502 A * | 5/2000 | Burns | ................... | H04B 10/114 398/117 |
| 6,230,214 B1 * | 5/2001 | Liukkonen | ......... | H04B 10/1143 398/9 |
| 6,236,486 B1 * | 5/2001 | Nocker, IV | ................ | B41J 3/36 398/117 |
| 6,577,419 B1 * | 6/2003 | Hall | ................... | H04B 10/1143 398/115 |
| 6,622,083 B1 * | 9/2003 | Knockeart | ........... | G01C 21/362 701/420 |
| 7,881,614 B2 * | 2/2011 | Ruiz | .................... | H04B 10/801 398/128 |
| 8,188,878 B2 | 5/2012 | Pederson et al. | | |
| 8,326,282 B2 * | 12/2012 | Margis | ............... | H04B 7/18508 455/3.01 |
| 8,503,886 B1 | 8/2013 | Gunasekara et al. | | |
| 9,043,938 B1 | 5/2015 | Raghu et al. | | |
| 2007/0015485 A1 * | 1/2007 | DeBiasio | ................ | H04B 1/082 455/345 |
| 2011/0069958 A1 * | 3/2011 | Haas | .................. | H04B 10/1149 398/77 |
| 2011/0116751 A1 * | 5/2011 | Terlizzi | ................ | G02B 6/3817 385/88 |
| 2011/0302616 A1 | 12/2011 | Mizukami et al. | | |
| 2014/0226983 A1 * | 8/2014 | Vargas | ................. | H04B 10/116 398/66 |
| 2015/0032296 A1 | 1/2015 | Girard et al. | | |
| 2015/0112542 A1 * | 4/2015 | Fuglewicz | ........... | G07C 5/0858 701/32.2 |
| 2015/0132006 A1 * | 5/2015 | Inoue | ................. | H05B 37/0263 398/118 |
| 2015/0349882 A1 * | 12/2015 | Lamkin | .............. | H04B 10/1123 398/121 |
| 2016/0068279 A1 * | 3/2016 | Buehler | ................ | B64F 5/0045 701/34.2 |
| 2016/0355198 A1 * | 12/2016 | Dulmage | ................ | H04L 69/18 |
| 2017/0200295 A1 * | 7/2017 | Grover | ................ | G06F 3/04847 |
| 2017/0206717 A1 * | 7/2017 | Kuhnapfel | ............. | G07C 5/008 |

OTHER PUBLICATIONS

Rundle, "In-flight Wi-Fi is 'direct link' to hackers", Apr. 15, 2015, pp. 14, Publisher: Wired Entertainment.

* cited by examiner

OPTICAL WIRELESS COMMUNICATIONS FOR VEHICLE OPERATOR PERSONAL COMPUTING DEVICES

BACKGROUND

Tablets, handheld devices and wearable device are all examples of personal computing devices which can provide a user with ready access to a plenitude of information. For vehicle operators in particular, such as train engineers, aircraft and watercraft pilots, or automobile drivers for example, a personal computing device can run applications that can access the vehicle's data bus and communicate with on-board computers and/or sensors. The personal computing device can thus be utilized by the vehicle operator to monitor on-board vehicle equipment operating status and health information, link with navigation systems to monitor and/or control vehicle position, target destinations, and route information, upload application updates or database updates to the on-board computers, or for many other purposes. Furthermore, applications that execute on personal computing devices can avoid regulatory certifications often required for applications executed directly by on-board vehicle computers.

However, one challenge that remains is how to establish a communication link between the vehicle operator's personal computing device and the on-board system that is secure, high speed, and neither causes or receives interference with other on-board electronics. While a physical cable may provide these features, such tethering of the personal computing device largely interferes with the convenience of the personal computing device being mobile. Wireless radio communication provide the convenience of mobility, but these links are not secure in that their signals can be intercepted by non-authorized users and/or interfered with. Moreover, wireless radio communication signals have been shown to interference with on-board electronics, which can lead to safety concerns such as when the vehicle is an aircraft.

For the reasons stated above and for other reasons stated below which will become apparent to those skilled in the art upon reading and understanding the specification, there is a need in the art for optical wireless communications for vehicle operator personal computing devices.

SUMMARY

The Embodiments of the present disclosure provide methods and systems for optical wireless communications for vehicle operator personal computing devices and will be understood by reading and studying the following specification.

In one embodiment, a secure vehicle data communication system comprises: a bus input-output (I/O) processor coupled to a vehicle data bus onboard a vehicle, the I/O processor executing a protocol converter; an optical communication transceiver coupled to the input-output processor, wherein the optical communication transceiver is in communication with an optical unit comprising an optical emitter and an optical sensor, the optical unit positioned within a vehicle operator control compartment of the vehicle; wherein the bus I/O processor exchanges vehicle operational data with one or more on-board data processing devices over the vehicle data bus using at least one vehicle data bus protocol; wherein the optical communication transceiver is configured to control the optical unit to establish a bidirectional optical wireless communications (OWC) link with a personal computing device located within the vehicle operator control compartment using an OWC protocol; and wherein bus input-output (I/O) processor communicates information relevant to the operation of the vehicle between a first on-board data processing device and at least one application executing on the personal computing device over the OWC link.

DRAWINGS

Embodiments of the present disclosure can be more easily understood and further advantages and uses thereof more readily apparent, when considered in view of the description of the preferred embodiments and the following figures in which.

In accordance with common practice, the various described features are not drawn to scale but are drawn to emphasize features relevant to the present disclosure. Reference characters denote like elements throughout figures and text.

DETAILED DESCRIPTION

In the following detailed description, reference is made to the accompanying drawings that form a part hereof, and in which is shown by way of specific illustrative embodiments in which the embodiments may be practiced. These embodiments are described in sufficient detail to enable those skilled in the art to practice the embodiments, and it is to be understood that other embodiments may be utilized and that logical, mechanical and electrical changes may be made without departing from the scope of the present disclosure. The following detailed description is, therefore, not to be taken in a limiting sense.

Embodiments of the present disclosure systems and methods that provide wireless communications between a vehicle and a vehicle operator's personal computing device through the utilization of optical communications links accessible from the vehicle's control compartment (e.g., which may be more specifically referred to as the bridge, cockpit, or crew and/or driver's cab, etc. depending on the type of vehicle). It thus is expressly intended that the embodiment disclosed herein are not limited to an single form of transportation, but are broadly applicable to many types of vehicles such as, but not limited to watercraft, aircraft, spacecraft, trains, automobiles, and so forth. As described below, optical communications links can facilitate connectivity between the vehicle operator's personal computing device and the vehicles data based that are secure, high speed and resistant to causing or receiving interference.

Figure 1:
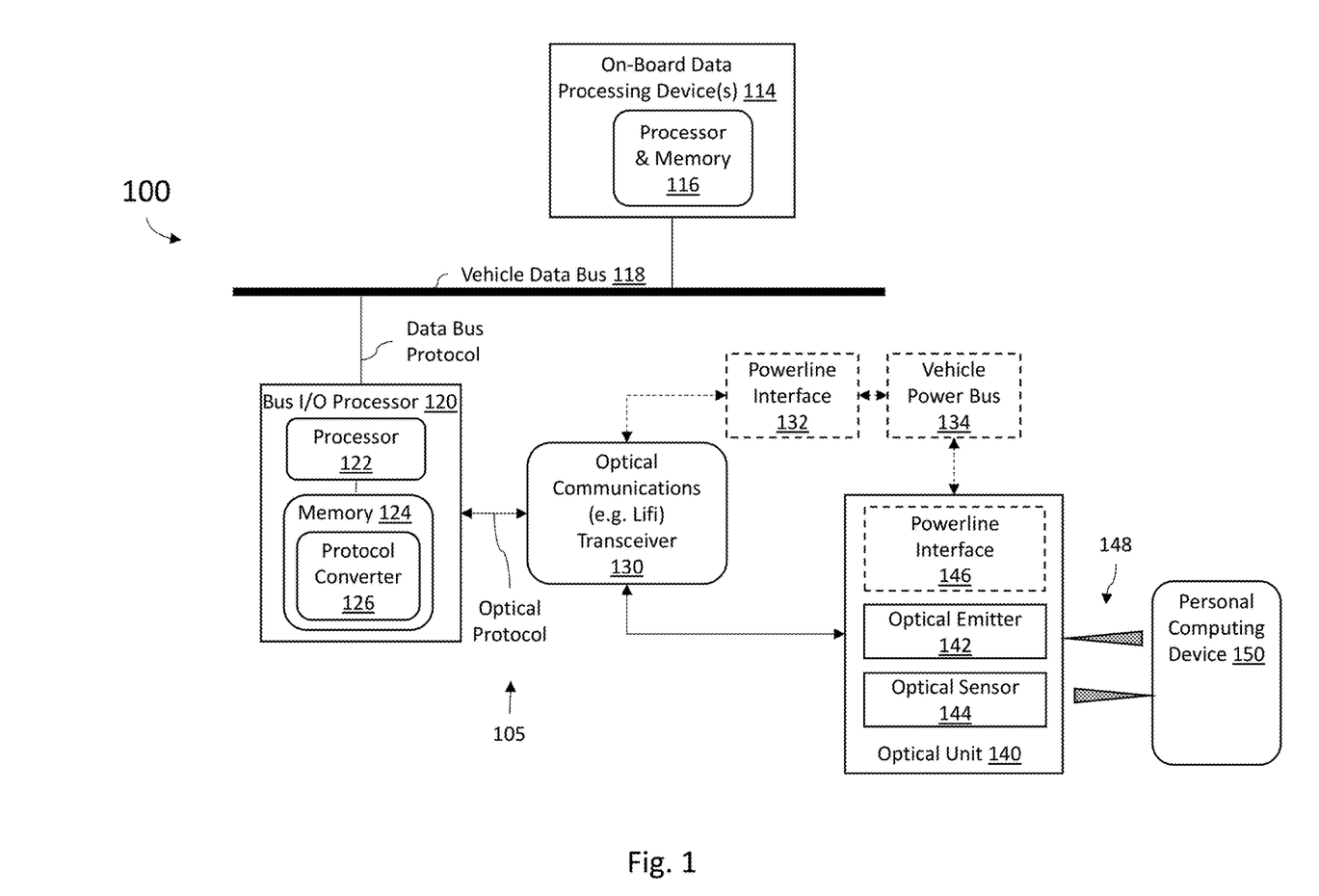
FIG. 1 is a block diagram illustrating an on-board optical wireless communications system of one embodiment of the present disclosure.

FIG. 1 is a block diagram illustrating an on-board optical wireless communications system 100 of one embodiment of the present disclosure. With system 100, a vehicle operator's personal computing device 150 can exchange data with one or more on-board data processing devices 114 by accessing the vehicle data bus 118 via a through-air bidirectional optical wireless communications (OWC) link 148. As shown in FIG. 1, an on-vehicle component 105 of system 100 comprises a vehicle data bus 118 coupled to one or more on-board data processing devices 114. In one embodiment, an on-board data processing devices 114 may include an vehicle operations processor and memory (shown at 116) that collects and stores vehicle data, which is data relevant to the control and operation of the vehicle (such as equipment operating status and health information, navigation systems information, and/or other data collected from on-board sensors, for example). In some embodiments, an on-board data processing device 114 may include a sensor that directly supplies vehicle data to the vehicle data bus 118.

The on-vehicle component 105 further includes a bus Input/output (I/O) processor 120 coupled to the vehicle data bus 118 to manage I/O communications between the vehicle data bus 118 and external components. For example, in one embodiment where the an on-board data processing device 114 outputs a stream of data to the vehicle data bus 118, the bus I/O processor 120 may process that stream of data into I/O data in order to make it available and usable to devices without direct access to the vehicle data bus 118. With embodiments of the present disclosure, devices without direct access to the vehicle data bus 118 may access the vehicle data bus 118 by communicating with the bus I/O processor 120 via an optical communications transceiver 130 coupled to an optical unit 140.

As shown in FIG. 1, the bus I/O processor 120 may include a process 122 coupled to a memory 124 which executes code (shown at 126) to implement a protocol converter. That is, to communicate data from the vehicle data bus 118 to the vehicle operator's personal computing device 150 (which may be referred to herein as communicating in the downlink direction), in one embodiment the protocol converter 126 performs a process that includes receiving the relevant data from the vehicle data bus 118 and transforming that data into an OWC protocol compatible with the optical communications transceiver 130. The optical communications transceiver 130 upon receiving the OWC protocol data continues the process by controlling an optical emitter 142 in the optical unit 140 to send an optical signal transmission out into the vehicle's control compartment for reception by the vehicle operator's personal computing device 150. Conversely, to communicate data from the vehicle operator's personal computing device 150 to the vehicle data bus 118 (which may be referred to herein as communicating in the uplink direction), an optical sensor 144 in the optical unit 140 receives an optical signal transmission from the vehicle operator's personal computing device 150 which is provided to the optical communications transceiver 130 for communication to the bus I/O processor 120 as OWC protocol data. In the bus I/O processor 120 the OWC protocol data received form the optical communications transceiver 130 is input to the protocol converter 126 and transforming that data into a vehicle data bus protocol usable by one or more of the on-board data processing devices 114.

For example, for an embodiment where the optical wireless communications system 100 is implemented for an aircraft, example protocols with which data may be placed on the vehicle data bus 118 include but are not limited to ARINC 429, Avionics Standard Communications Bus (ASCB), Avionics Full-Duplex Switched Ethernet (AFDX), RS-232, RS-422, ARINC 453, Ethernet, Universal Serial Bus (USB), Controller Area Network (CAN), and MIL-STD 1553. For other vehicles, one or more of these same protocols, or still other protocols may be used. OWC protocols which may be used for aircraft implementations, or any other vehicle implementation, include but are not limited to bidirectional Light Fidelity (Li-Fi), Infrared Data Association (IrDA) and IrDA Link Access Protocol (IrLAP) and wireless body area network (WBAN), wireless personal area network (WPAN) or other protocols under IEEE 802.15.7.

In some implementations, the vehicle data bus 118 may in fact carry communications using multiple vehicle data bus protocols, for example where some number of the on-board data processing devices 114 utilize a different protocols for communicating I/O data than other on-board data processing devices 114. In that case, when the Bus I/O Processor 120 receives an uplink communication from the mobile computing device 150, it knows which protocol to convert the communication into based on which on-board data processing device 114 is intended to receive the communication. In other embodiments, other criteria may be utilized. For example, an application executing on the mobile computing device 150 may make the determination as to which protocol the protocol converter 126 of Bus I/O Processor 120 uses to place uplink information onto the vehicle data bus 118.

As mentioned above, the optical communications transceiver 130 transmits downlink optical communication signals into the vehicle's control compartment by controlling the light generated from optical emitter 142 as set forth by the OWC protocol in use by the optical communications transceiver 130. In some embodiments, the optical emitter 142 comprises an light emitting diode (LED) transmitter which varies or otherwise modulates the light it outputs in response to control signals from the optical communications transceiver 130. The optical emitter 142 may generate optical signals, for example, in the visual light spectrum, Infrared-red spectrum, near-ultraviolet spectrum, or range of wavelengths. Where the optical emitter 142 transmits in the visual light spectrum, the intensity of light may be dimmed to operate at a level not perceptible to human beings so as not to distract the vehicle operator. Moreover, in some embodiments, current to the optical emitter 142 may be switch off and on at a frequency perceptible to the human eye.

Uplink optical communication signals received from the personal computing device 150 are detected by the optical sensor 144 and converted into electrical signals which are sent to the optical communications transceiver. In some embodiments, the optical sensor 144 include an optical communication image sensor (OCI) based on a complementary metal-oxide-semiconductor (CMOS) technology, for example. In some embodiments, the optical communications transceiver 130 and the optical unit 140 may be physically separate component, as shown in FIG. 1. However in other embodiments, one or both of the optical emitter 142 and/or the optical sensor 144 that make up the optical unit 140 may be integrated into the optical communications transceiver 130. The optical emitter 142 and the optical sensor 144 may be positioned within the vehicle's control compartment to optimize communications with the personal computing device 150, while at the same time minimizing the potential for leakage of the optical communication signals from the vehicle's control compartment. Uplink optical communications may be communicated using a different wavelength spectrum then downlink optical communications in order to avoid interference or crosstalk. For example, uplink optical communications may be communicated using the IR spectrum while downlink optical communications are communicated using the visible light spectrum, or vice versa.

Figure 1A:
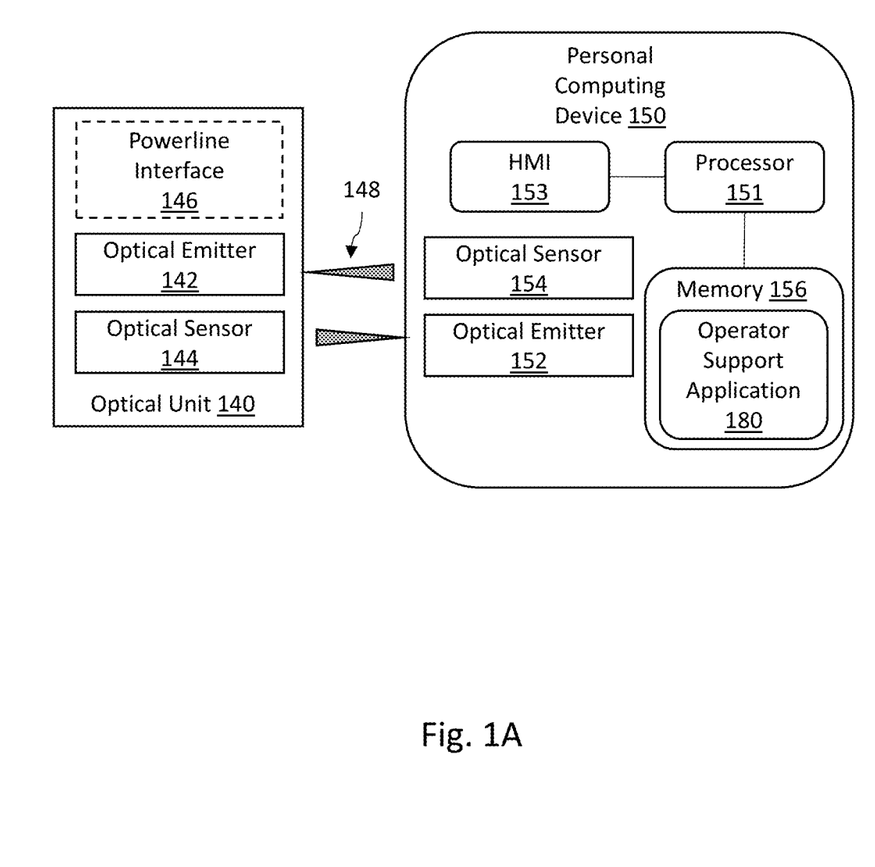
FIG. 1A is a block diagram illustrating the interface between a mobile personal computing device and an optical unit for an on-board optical wireless communications system of one embodiment of the present disclosure.

FIG. 1A is a block diagram that illustrates additional components of one exemplary embodiment of the personal computing device 150 described with respect to FIG. 1. In one example embodiment, the personal computing device 150 comprises a processor 151 coupled to a memory 156 (that stores data and at least one support application 180 that is executed by the processor 151) and a human machine interface 153 (such as a touchscreen panel and/or one or more buttons, for example). The support application 180 includes the code executed by the processor 151 to permit the vehicle's operator to utilize the personal computing device 150 to perform one or more of the functions described above such as but not limited to vehicle monitoring, navigation, communications, or operational functions. In order to communicate with the optical communications transceiver, the personal computing device 150 further comprises an optical emitter 152 and optical sensor 154 which are coupled to and controlled by the processor 151. The processor 151 is programed to operate the optical emitter 152 and optical sensor 154 to establish the optical wireless communications (OWC) link 148 with the optical unit 140 according to the OWC protocol.

For uplink communications, the processor 151 controls the optical emitter 152 to send an uplink optical signal transmission out into the vehicle's control compartment for reception by the on-board optical sensor 144. Conversely, for downlink communications, the optical sensor 154 in the personal computing device 150 receives downlink optical signal transmissions from the vehicle's optical emitter 142. In some embodiments, the optical emitter 152 comprises an LED transmitter which varies or otherwise modulates the light it outputs in response to control signals from the processor 151. The optical emitter 152 may generate optical signals, for example, in the visual light spectrum, infrared-red spectrum, near-ultraviolet spectrum, or range of wavelengths. Where the optical emitter 152 transmits in the visual light spectrum, the intensity of light may be dimmed to operate at a level not perceptible to human beings so as not to distract the vehicle operator. Moreover, in some embodiments, current to the optical emitter 152 may be switch off and on at a frequency perceptible to the human eye. Downlink optical communication signals received from the optical emitter 142 are detected by the optical sensor 154 and converted into electrical signals which are sent to the processor 151. In some embodiments, the optical sensor 154 include an optical communication image sensor (OCI) based on a complementary metal-oxide-semiconductor (CMOS) technology, for example.

In some embodiments, the optical emitter 152 and optical sensor 154 may be device components built into the personal computing device 150. In other embodiments, the optical emitter 152 and optical sensor 154 may be installed within a plug-in transceiver accessory that couples to the personal computing device 150 via an expansion or dock connector port such as a USB type standard port or a Lightning connector port, for example.

In one embodiment in operation, the optical communications transceiver may freely broadcast information into the vehicle's control compartment for consumption by the personal computing device 150. For example, in one embodiment an application running on one of the on-board data processing devices 114 may routinely provide vehicle data to the vehicle data bus 118 (for example, equipment status updates) which bus I/O processor 120 send to the optical communications transceiver 130 for transmission into the vehicle's control compartment for consumption by the personal computing device 150. For example, support application 180 may receive that information and update data within memory 156 and/or display it on the HMI 153 either automatically or when requested by the vehicle operator. In other embodiments, the vehicle operator may operate the HMI 153 to cause the support application 180 to request retrieval of specific information from the vehicle data bus 118. The request would be received from the personal computing device 150 as an uplink optical communication by the optical communications transceiver 130, and the bus I/O processor 120 would then request the relevant data from an on-board data processing device 114 via the vehicle data bus 118. In one embodiment, the protocol converter 126 will convert the uplink optical communication to an appropriate vehicle bus protocol based on the protocol supported by the on-board data processing device 114 expected to supply vehicle data information in response to the request. It should also be appreciate that in still other embodiments, the vehicle operator's personal computing device 150 may use uplink optical communications to load software updates, route plans (such as flight plans, for example), database updates, or similar information onto on-board data processing devices 114.

Which such embodiments, a data connectivity link between the vehicle data bus 118 and the vehicle operator's personal computing device 150 can be established within the secure space of the vehicle's control compartment. The optical signals utilized by these embodiments cannot penetrate walls and therefore cannot be intercepted by anyone outside of the vehicle's control compartment, or otherwise intentionally tampered with. Moreover, the optical signals do not interfere with the existing radio communication used by the vehicle, or other vehicle electronics, but can provide connectivity at high data rates.

Also as shown in FIG. 1, the optical communications transceiver 130 and the optical unit 140 need not be directly coupled together via dedicated wiring, but may optionally utilize existing power distribution buses 134 to communicate signals to each other using power line communication. For example, the optical unit 140 can be installed into an existing cockpit lighting fixture, or otherwise installed as a new fixture coupled to the existing vehicle power distribution bus 134. The optical communications transceiver 130 may then be coupled to the existing vehicle power distribution bus 134 via a first powerline communications interface 132 while the optical unit 140 may comprise a second powerline communications interface 146 that couples to the existing vehicle power distribution bus 134. Signaling and the communication of information between the optical unit 140 and the optical communications transceiver 130 then takes place via communications signals transmitted over the vehicle power distribution bus 134. In one embodiment the optical unit 140 and the optical communications transceiver 130 may both be powered by the same vehicle power distribution bus 134 which they use to communicate. In this way, the optical wireless communications system 100 may be installed in a vehicle without the need to extend wiring.

Figure 2:
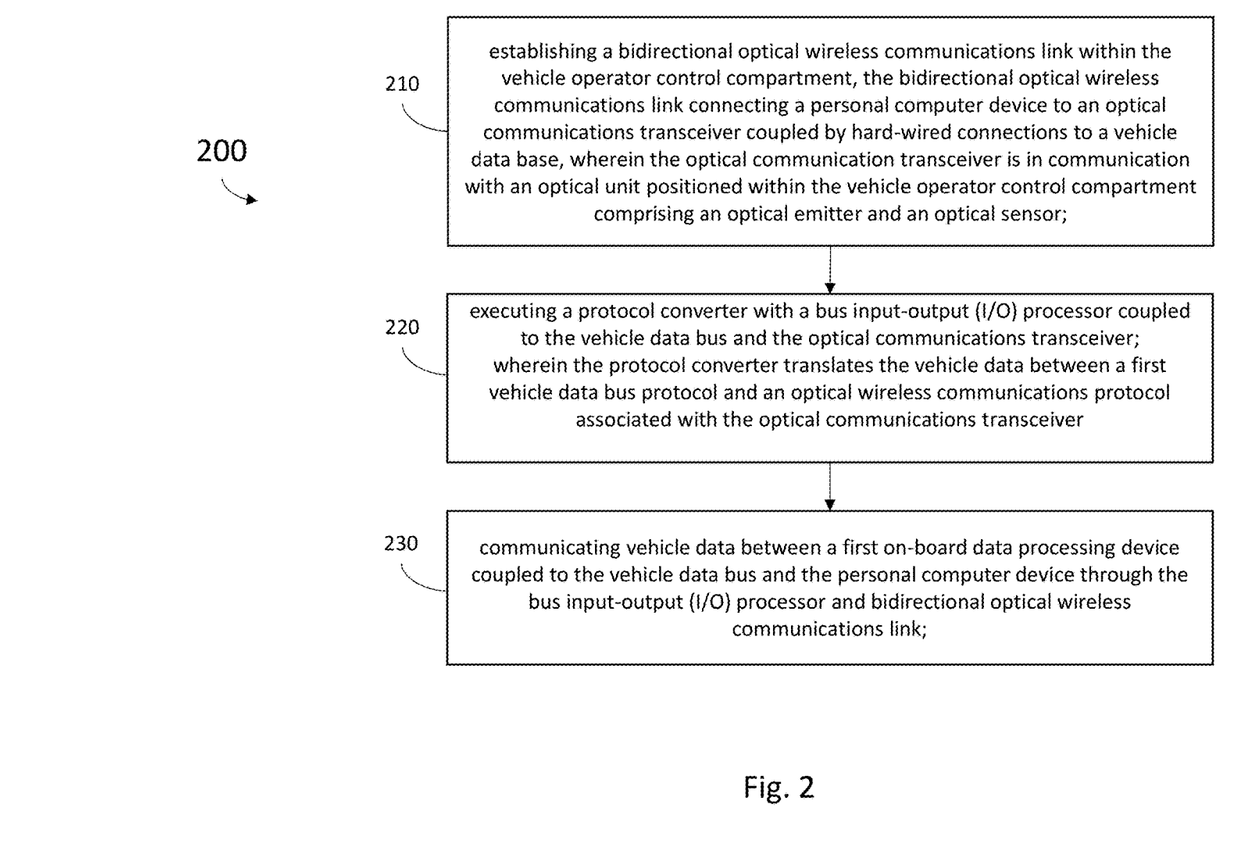
FIG. 2 is a flow chart illustrating a method of one embodiment of the present disclosure.

FIG. 2 is a flow chart illustrating a method for secure data vehicle data communication with personal computing devices within a vehicle operator control compartment of a vehicle. It should be understood that method 200, or parts thereof, may be implemented in conjunction with any of the various embodiments and implementations described in this disclosure with respect to FIGS. 1 and 1A above or otherwise disclosed herein. As such, elements of method 200 may be used in conjunction with, in combination with, or substituted for elements of those embodiments. Further, the functions, structures and other description of elements for such embodiments described herein may apply to like named elements of method 200 and vice versa.

Method 200 begins at 210 with establishing a bidirectional optical wireless communications link within the vehicle operator control compartment, the bidirectional optical wireless communications link connecting a personal computer device to an optical communications transceiver coupled by hard-wired connections to a vehicle data bus, wherein the optical communication transceiver is in communication with an optical unit positioned within the vehicle operator control compartment comprising an optical emitter and an optical sensor.

Method 200 proceeds to 220 with executing a protocol converter with a bus input-output (I/O) processor coupled to the vehicle data bus and the optical communications transceiver. As described above, the protocol converter translates the vehicle data between a first vehicle data bus protocol and an optical wireless communications protocol associated with the optical communications transceiver. In one embodiment, the protocol converter selects the first vehicle data bus protocol from a plurality of vehicle data bus protocols in use on the vehicle data bus by associating the first vehicle data bus protocol with the first on-board data processing device. Alternatively, the first vehicle data bus protocol is selected by the protocol converter from a plurality of vehicle data bus protocols based on which of the one or more on-board data processing devices will response to the information request.

Method 200 proceeds to 230 with communicating vehicle data between a first on-board data processing device coupled to the vehicle data bus and the personal computer device through the bus input-output (I/O) processor and bidirectional optical wireless communications link.

For some embodiments, the vehicle is an aircraft and the vehicle data bus is an avionics data bus. The personal computer device may comprise at least one application that receives information relevant to the control and operation of the vehicle (such as equipment operating status and health information, navigation systems information, and/or other data collected from on-board sensors, for example) via the optical wireless communications link. The application may instead, or also be, configured to upload either a flight plan information to an avionics device coupled to the avionics bus via the optical wireless communications link, or a software update to an avionics device coupled to the avionics bus via the optical wireless communications link. In some embodiments, the optical communications transceiver may be coupled to a vehicle power distribution bus via a first powerline communications interface. Similarly, the optical unit may be coupled to the vehicle power distribution bus via a second powerline communications interface. In that case, at least one of the optical emitter and/or the optical sensor may communicate with the optical communications transceiver using power line communication over the vehicle power distribution bus. Moreover, the optical emitter and/or the optical sensor may be installed in a general lighting fixture within the vehicle operator control compartment and communicate with the optical communications transceiver using powerline communications over the vehicle power distribution bus.

EXAMPLE EMBODIMENTS

Example 1 includes a secure vehicle data communication system, the system comprising: a bus input-output (I/O) processor coupled to a vehicle data bus onboard a vehicle, the I/O processor executing a protocol converter; and an optical communication transceiver coupled to the input-output processor, wherein the optical communication transceiver is in communication with an optical unit comprising an optical emitter and an optical sensor, the optical unit positioned within a vehicle operator control compartment of the vehicle; wherein the bus I/O processor exchanges vehicle operational data with one or more on-board data processing devices over the vehicle data bus using at least one vehicle data bus protocol; wherein the optical communication transceiver is configured to control the optical unit to establish a bidirectional optical wireless communications (OWC) link with a personal computing device located within the vehicle operator control compartment using an OWC protocol; and wherein bus input-output (I/O) processor communicates information relevant to the operation of the vehicle between a first on-board data processing device and at least one application executing on the personal computing device over the OWC link.

Example 2 includes the system of example 1, wherein the protocol converter: receives the information relevant to the operation of the vehicle from the first on-board data processing device; translates the information relevant to the operation of the vehicle from the at least one vehicle data bus protocol to the OWC protocol; and outputs the information relevant to the operation of the vehicle to the optical communication transceiver to generate a downlink optical communications signal.

Example 3 includes the system of any of examples 1-2, wherein the protocol converter: receives an information request from the at least one application executing on the personal computing device; translates the information request from the OWC protocol into a first vehicle data bus protocol; and outputs the information request to the vehicle data bus; wherein the first vehicle data bus protocol is selected by the protocol converter from a plurality of vehicle data bus protocols based on which of the one or more on-board data processing devices will response to the information request.

Example 4 includes the system of any of examples 1-3, wherein one or both of the optical emitter and the optical sensor are integral to the optical communication transceiver.

Example 5 includes the system of any of examples 1-4, wherein the personal computing device comprises a processor executing the at least one application, the processor coupled to a second optical communication transceiver.

Example 6 includes the system of example 5, wherein the second optical communication transceiver is comprised within a plug-in accessory physically coupled to the personal computing device.

Example 7 includes the system of any of examples 1-6, wherein the vehicle is an aircraft and the vehicle data bus is an avionics data bus.

Example 8 includes the system of example 7, wherein the at least one application is configured to upload a flight plan information to an avionics device coupled to the avionics bus via the OWC link.

Example 9 includes the system of any of examples 7-8, wherein the at least one application is configured to upload a software update to an avionics device coupled to the avionics bus via the OWC link.

Example 10 includes the system of any of examples 1-9, wherein the OWC link is a light-fidelity (Li-Fi) communication link.

Example 11 includes the system of any of examples 1-10, wherein the optical communications transceiver is coupled to a vehicle power distribution bus via a first powerline communications interface; wherein the optical unit is coupled to the vehicle power distribution bus via a second powerline communications interface; and wherein at least one of the optical emitter and optical sensor communicate with the optical communications transceiver using power line communication over the vehicle power distribution bus Example 12 includes the system of any of examples 1-11, wherein the optical emitter is installed in a general lighting fixture within the vehicle operator control compartment.

Example 13 includes the system of any of examples 1-12, wherein OWC link communicates over a first optical spectrum in the uplink direction, and a different second optical spectrum in the downlink direction.

Example 14 includes a method for secure data vehicle data communication with personal computing devices within a vehicle operator control compartment of a vehicle, the method comprising: establishing a bidirectional optical wireless communications link within the vehicle operator control compartment, the bidirectional optical wireless communications link connecting a personal computer device to an optical communications transceiver coupled by hardwired connections to a vehicle data bus, wherein the optical communication transceiver is in communication with an optical unit positioned within the vehicle operator control compartment comprising an optical emitter and an optical sensor; executing a protocol converter with a bus input-output (I/O) processor coupled to the vehicle data bus and the optical communications transceiver; and communicating vehicle data between a first on-board data processing device coupled to the vehicle data bus and the personal computer device through the bus input-output (I/O) processor and bidirectional optical wireless communications link; wherein the protocol converter translates the vehicle data between a first vehicle data bus protocol and an optical wireless communications protocol associated with the optical communications transceiver Example 15 includes the method of any example 14, wherein the protocol converter selects the first vehicle data bus protocol from a plurality of vehicle data bus protocols in use on the vehicle data bus by associating the first vehicle data bus protocol with the first on-board data processing device.

Example 16 includes the method of any of examples 14-15, the protocol converter: receives an information request from the at least one application executing on the personal computing device; translates the information request from the optical wireless communications protocol into a first vehicle data bus protocol; and outputs the information request to the vehicle data bus; wherein the first vehicle data bus protocol is selected by the protocol converter from a plurality of vehicle data bus protocols based on which of the one or more on-board data processing devices will response to the information request.

Example 17 includes the method of any of examples 14-16, wherein the vehicle is an aircraft and the vehicle data bus is an avionics data bus.

Example 18 includes the method of example 17, wherein the personal computer device comprises at least one application configured to upload either: a flight plan information to an avionics device coupled to the avionics bus via the optical wireless communications link; or a software update to an avionics device coupled to the avionics bus via the optical wireless communications link.

Example 19 includes the method of any of examples 14-18, wherein the optical communications transceiver is coupled to a vehicle power distribution bus via a first powerline communications interface; wherein the optical unit is coupled to the vehicle power distribution bus via a second powerline communications interface; and wherein at least one of the optical emitter and optical sensor communicate with the optical communications transceiver using power line communication over the vehicle power distribution bus.

Example 20 includes the method of any of examples 14-19, wherein the optical emitter is installed in a general lighting fixture within the vehicle operator control compartment.

In various alternative embodiments, system elements, method steps, or examples described throughout this disclosure (such as but not limited to the Protocol Converter and Bus I/O processor, Personal Computing Device, operator support application, powerline interface and/or sub-parts of any thereof, for example) may be implemented using one or more computer systems, field programmable gate arrays (FPGAs), or similar devices and/or comprising a processor coupled to a memory and executing code to realize those elements, processes, steps or examples, said code stored on a non-transient data storage device. Therefore other embodiments of the present disclosure may include elements comprising program instructions resident on computer readable media which when implemented by such computer systems, enable them to implement the embodiments described herein. As used herein, the term "computer readable media" refers to tangible memory storage devices having non-transient physical forms. Such non-transient physical forms may include computer memory devices, such as but not limited to punch cards, magnetic disk or tape, any optical data storage system, flash read only memory (ROM), non-volatile ROM, programmable ROM (PROM), erasable-programmable ROM (E-PROM), random access memory (RAM), or any other form of permanent, semi-permanent, or temporary memory storage system or device having a physical, tangible form. Program instructions include, but are not limited to computer-executable instructions executed by computer system processors and hardware description languages such as Very High Speed Integrated Circuit (VHSIC) Hardware Description Language (VHDL).

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the presented embodiments. Therefore, it is manifestly intended that embodiments be limited only by the claims and the equivalents thereof.

What is claimed is:

1. A secure vehicle data communication system, the system comprising:
   an optical unit including an optical emitter and an optical sensor, the optical unit positioned within a vehicle operator control compartment of a vehicle;
   an optical communication transceiver in communication with the optical unit, the optical communication transceiver configured to:
      control the optical unit to establish a bidirectional optical wireless communications (OWC) link with a personal computing device located within the vehicle operator control compartment using an OWC protocol; and
   a bus input-output (I/O) processor coupled to the optical communication transceiver and further coupled to a vehicle data bus onboard the vehicle, the bus I/O processor executing a protocol converter, wherein the bus I/O processor is configured to:

receive, by the protocol converter, an information request through the OWC link from at least one application executing on the personal computing device;

translate, by the protocol converter, the information request from the OWC protocol into a first vehicle data bus protocol, the first vehicle data bus protocol selected by the protocol converter from a plurality of vehicle data bus protocols based on which one of one or more on-board data processing devices will respond to the information request;

output, by the protocol converter, the information request to the vehicle data bus;

receive, from a first on-board data processing device responding to the information request, information relevant to the operation of the vehicle requested in the information request; and communicate, over the OWC link, the information relevant to the operation of the vehicle from the first on-board data processing devices to the at least one application executing on the personal computing device.

2. The system of claim 1, wherein the bus I/O processor is further configured to:

receive, by the protocol converter, the information relevant to the operation of the vehicle from the first on-board data processing device;

translate, by the protocol converter, the information relevant to the operation of the vehicle from the at least one vehicle data bus protocol to the OWC protocol; and output, by the protocol converter, the information relevant to the operation of the vehicle to the optical communication transceiver to generate a downlink optical communications signal.

3. The system of claim 1, wherein one or both of the optical emitter and the optical sensor are integral to the optical communication transceiver.

4. The system of claim 1, wherein the personal computing device comprises a processor executing the at least one application, the processor coupled to a second optical communication transceiver.

5. The system of claim 4, wherein the second optical communication transceiver is comprised within a plug-in accessory physically coupled to the personal computing device.

6. The system of claim 1, wherein the vehicle is an aircraft and the vehicle data bus is an avionics data bus.

7. The system of claim 6, wherein the at least one application is configured to upload a flight plan information to an avionics device coupled to the avionics bus via the OWC link.

8. The system of claim 6, wherein the at least one application is configured to upload a software update to an avionics device coupled to the avionics bus via the OWC link.

9. The system of claim 1, wherein the OWC link is a light-fidelity (Li-Fi) communication link.

10. The system of claim 1, wherein the optical communications transceiver is coupled to a vehicle power distribution bus via a first powerline communications interface;

wherein the optical unit is coupled to the vehicle power distribution bus via a second powerline communications interface; and wherein at least one of the optical emitter and optical sensor communicate with the optical communications transceiver using power line communication over the vehicle power distribution bus.

11. The system of claim 1, wherein the optical emitter is installed in a general lighting fixture within the vehicle operator control compartment.

12. The system of claim 1, wherein OWC link communicates over a first optical spectrum in an uplink direction, and a different second optical spectrum in a downlink direction.

13. The system of claim 1, wherein the at least one application executing on the personal computing device is configured to use uplink optical communications to load at least one of software updates, route plans, or database updates onto the one or more on-board data processing devices.

14. A method for secure data vehicle data communication with personal computing devices within a vehicle operator control compartment of a vehicle, the method comprising:

establishing a bidirectional optical wireless communications (OWC) link within the vehicle operator control compartment, the bidirectional OWC link connecting a personal computer device to an optical communication transceiver coupled to a bus input-output (I/O) processor, wherein the optical communication transceiver is in communication with an optical unit positioned within the vehicle operator control compartment comprising an optical emitter and an optical sensor;

executing a protocol converter with the bus I/O processor coupled to a vehicle data bus and the optical communications transceiver, the protocol converter configured to:

receive an information request through the OWC link from at least one application executing on the personal computing device;

translate the information request from an OWC protocol into a first vehicle data bus protocol, the first vehicle data bus protocol selected by the protocol converter from a plurality of vehicle data bus protocols based on which one of one or more on-board data processing devices will respond to the information request; and output the information request to the vehicle data bus; and communicating vehicle data relevant to the operation of the vehicle between a first on-board data processing device coupled to the vehicle data bus and the at least one application executing on the personal computer device through the bus I/O processor and bidirectional OWC link.

15. The method of claim 14, wherein the protocol converter is further configured to:

select the first vehicle data bus protocol from a plurality of vehicle data bus protocols in use on the vehicle data bus by associating the first vehicle data bus protocol with the first on-board data processing device.

16. The method of claim 14, wherein the vehicle is an aircraft and the vehicle data bus is an avionics data bus.

17. The method of claim 16, wherein the personal computer device comprises at least one application configured to upload either:

a flight plan information to an avionics device coupled to the avionics bus via the optical wireless communications link; or a software update to an avionics device coupled to the avionics bus via the optical wireless communications link.

18. The method of claim 14, wherein the optical communications transceiver is coupled to a vehicle power distribution bus via a first powerline communications interface;

wherein the optical unit is coupled to the vehicle power distribution bus via a second powerline communications interface; and wherein at least one of the optical emitter and optical sensor communicate with the optical communications transceiver using power line communication over the vehicle power distribution bus.

19. The method of claim 14, wherein the optical emitter is installed in a general lighting fixture within the vehicle operator control compartment.

20. The method of claim 14, wherein the at least one application executing on the personal computing device is configured to use uplink optical communications to load at least one of software updates, route plans, or database updates onto the one or more on-board data processing devices.

* * * * *